1,867,302

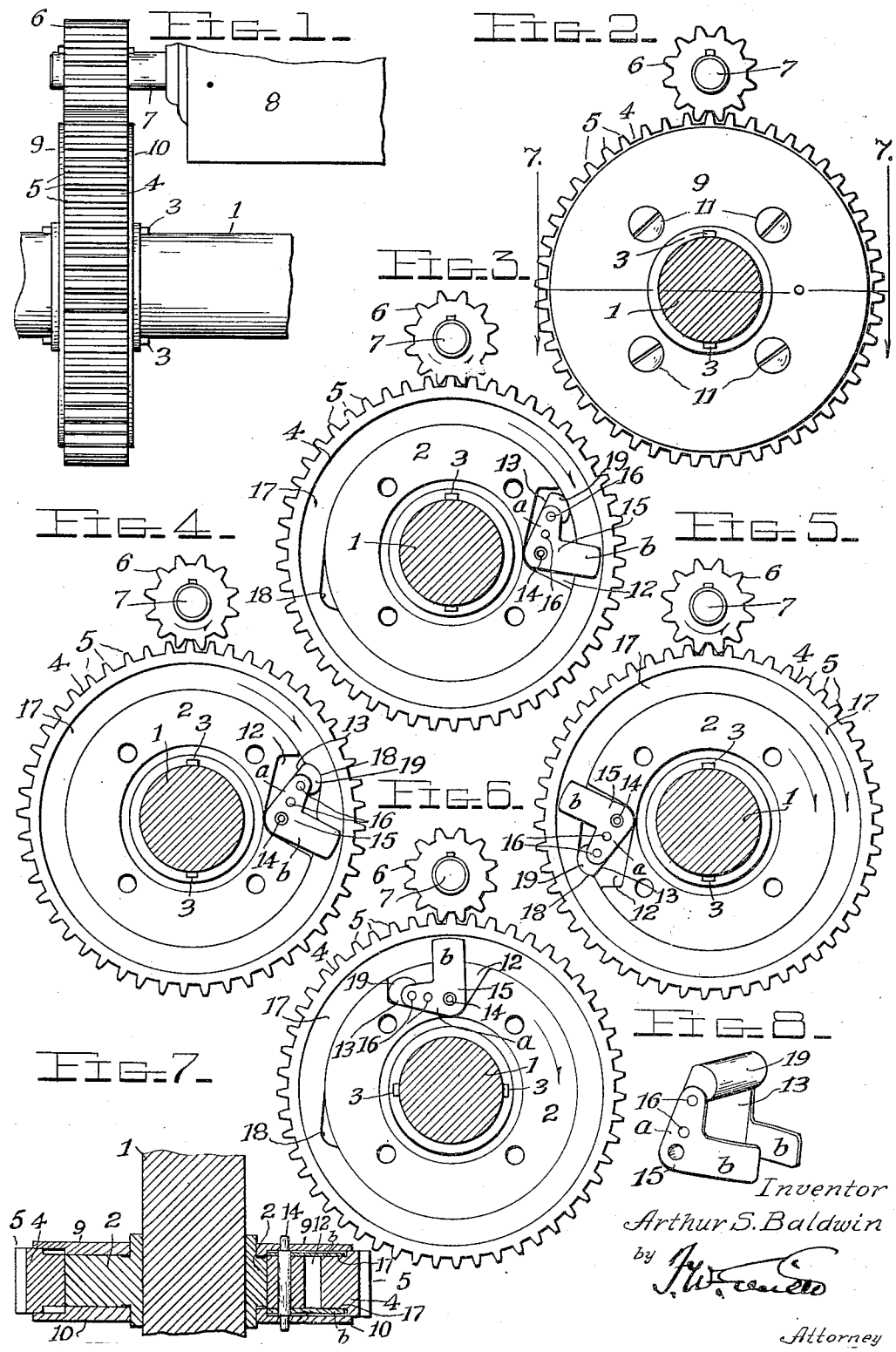
July 12, 1932.  A. S. BALDWIN  1,867,302
OVERRUNNING CLUTCH
Filed Oct. 7, 1930
Inventor
Arthur S. Baldwin
Attorney Patented July 12, 1932

UNITED STATES PATENT OFFICE

ARTHUR S. BALDWIN, OF STRATFORD, CONNECTICUT

OVERRUNNING CLUTCH

Application filed October 7, 1930. Serial No. 486,912.

This invention relates to clutches of the overrunning type such as are available for self starters for automobiles, a clutch of this class being composed of a driving member and a driven member, in the present instance the driving member being a ring having gear teeth on its periphery, while the driven member is a circular head around which said ring is journaled, and this head is fixed on a shaft, as the cam shaft of an explosive engine, and means is employed for locking the ring and head together when the shaft is being driven by the rotation of the ring, and for releasing the ring when the shaft revolves at a speed faster than that occasioned by the ring.

The main object of this invention is to insure the locking together of the ring and head in order to drive the latter, and to render the release of the ring positive when the rotary speed of the head is greater than the speed imparted from the ring.

Further objects will be evident from the detail description which follows, and which is to be read in connection with the accompanying drawing, in which Figure 1 is a side elevation illustrating an embodiment of the invention—

Figure 2 is an end view—

Figures 3, 4, 5 and 6, are views similar to Figure 2, but with the cover plate removed and the driven shaft in section, and showing the relative positions of parts at the several stages of operation—

Figure 7 is a section at the line 7—7 of Figure 2, and

Figure 8 is a detail perspective view of the pawl structure.

Similar numerals of reference denote like parts in the several figures of the drawing.

Clutches of this sort are useful in constructions other than self starters for explosive engines, such as punch presses and transmission gearings, and other mechanisms that comprise driving and driven elements, and therefore the invention is not limited in its use, it being, broadly considered, an overrunning clutch, but for the purpose of a ready understanding of the invention, the description will refer more or less, to a starter for an explosive engine.

1 denotes the cam shaft of an explosive engine, and 2 is an enlarged circular head which is fixed on said shaft, as by splines 3, and journaled around said head is a ring 4 which has gear teeth 5 on its periphery, with which teeth meshes a spur gear 6 that is fixed to the shaft 7 of an auxiliary electric motor 8, so that it will be clear that when this motor is operated, the ring 4 will be revolved.

The head 2 is retained in position by means of cheek disks 9, 10, on opposite sides of the head, and screws 11 driven into these disks through the head, but this is a trivial matter and can impose no limitation.

Within the periphery of the head 2 is a pocket 12, and in the latter is a pawl 13 which is pivoted to the disks 9, 10, by a pin 14, and since these disks are rigid with the head the pawl will be carried by the head in its rotary movement.

15 are L-shaped thin metal pieces, whose inner lengths $a$ are secured to the sides of the pawl 13 by headed pins 16, and whose outer lengths $b$ project in parallelism and contact opposite annular faces of the ring 4, these faces being both alike and smooth, one of them appearing in elevation in Figures 3, 4, 5 and 6 and designated by the numeral 17.

These projecting parts $b$ are springs and they embrace the faces of the ring 4 with considerable pressure, sufficient to hold the pawl in any position and therefore serving to prevent any rattling of the pawl during the rotation of the head or ring.

Within the inner periphery of the ring 4 is a recess 18, and from an inspection of Figures 3 to 6 it will be clear that the nose 19 of the pawl is so contoured that it will conformably fit within this recess.

The pawl 13 is carried by the head 2 immediately adjacent the inner periphery of the ring 4, and, as heretofore stated, this periphery is journaled on said head; it will therefore be clear that, as the ring revolves in the direction of the arrow, the drag of the opposite annular faces of the ring against the spring embracing parts $b$ will cause the pawl structure to operate like a bell-crank lever and will therefore force the nose 19 of the pawl against said inner periphery, and when the recess 18 is opposite said nose, the latter will be forced by said drag into the recess, and thereafter the ring and head will be locked together and the latter will be driven by the ring.

When the speed of the shaft 1 and its head 2 exceeds that of the ring, the pawl structure, which is carried by the head, will be withdrawn from the recess 18, and the drag of the embracing parts b of the pawl structure against the sides of the ring will swing said structure so that the pawl member 13 will be forced inwardly within the pocket 12 of the head, and thereafter this head will be revolved independent of the ring.

In the exemplification of the application of this invention as a self starter for explosive engines, the only associated parts shown in the drawing are the auxiliary electric motor 8 with the spur gear 6 on the shaft of such motor and in engagement with the toothed ring 4, and the cam shaft 1, but, since it is well known that this cam shaft is geared to the engine shaft, and that the electric current for the motor is closed by pressing a button and then opened by releasing the latter, further illustration in these respects is deemed unnecessary, and the following description of the operation of this invention as an element in the self starter assembly for an explosive engine will therefore be readily understood.

When the motor is started the ring 4 will be revolved and the head 2 will be stationary until the recess 18 is opposite the nose of the pawl, whereupon the latter will be forced within this recess and the ring and head and consequently the cam shaft will be revolved in unison, and this will, of course, effect the revolution of the engine shaft; and when the engine is started the cam shaft will be revolved at a speed greatly in excess of that of the ring, and, as before explained, this will cause the pawl to be withdrawn from the recess 18, and the circuit of the motor can then be opened.

While only one pawl structure and one recess have been illustrated in the drawing, it will be obvious that a plurality of pawl structures and recesses may be utilized, if desired, this being a mere duplication of the present structure, and also a single pawl structure may be utilized with a plurality of recesses in the inner periphery of the ring; and therefore the invention is not limited in these respects.

This invention, while it accomplishes the same results as the ordinary overrunning clutch, nevertheless obviates the necessity of the precision with which the parts of such clutch must be made and prevents sticking of parts and the breaking of springs and ball clutches, with the resultant stripping of gears.

Furthermore, the connection of the spring members b of the pawl structure with the opposite faces of the toothed ring, not only insures the proper operation of the pawl, but prevents any rattling between such structure and the adjacent parts.

While the parts b of the bell-crank member 15 are preferably inherently resilient, it will be obvious that these parts b may be rendered resilient by spring means tending to force such parts toward each other, such as flat springs whose force is exerted against the outer faces of the parts b, or a contractile coil spring between the latter and acting to draw such parts toward each other, these modifications being within the range of the most ordinary mechanical skill, and therefore it is merely necessary, for the purposes of this invention that the parts b embrace the faces of the ring resiliently.

What is claimed is:—

1. An overrunning clutch comprising a shaft, an enlarged circular head fixed thereto and having a pocket within its periphery, a ring having side recesses journaled around said head and having gear teeth on its outer periphery and a recess in its inner periphery, a pawl structure carried by said head within said pocket and provided with spaced spring arms that embrace opposite faces of said ring and lie within the recesses, and means for initially revolving said ring.

2. A construction as in claim 1 in which the means for initially revolving the ring comprises a spur gear on the shaft of an auxiliary electric motor, while the head is kept in position within the ring by means of cheek plates and screws driven through said plates and head.

In testimony whereof I affix my signature hereto.

ARTHUR S. BALDWIN.